May 13, 1924.
A. P. FAY
1,493,850
BELT REPLACING DEVICE
Filed May 27, 1920 2 Sheets-Sheet 1
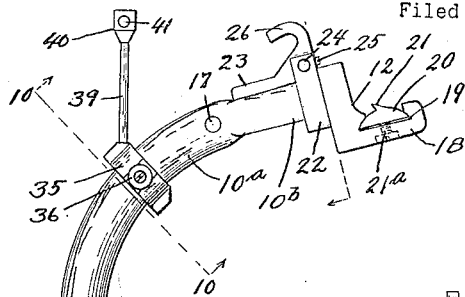
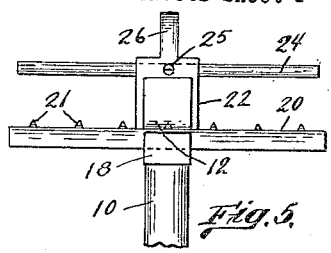
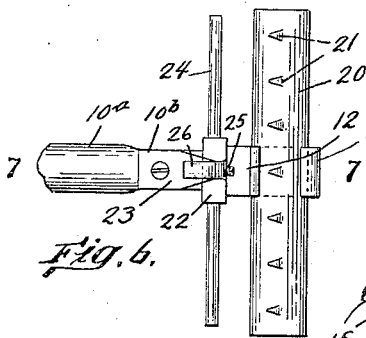
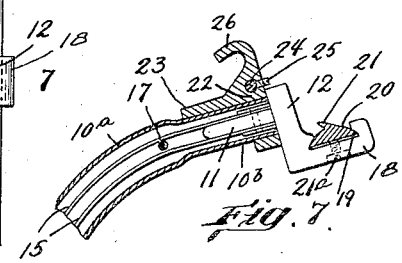
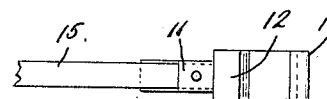
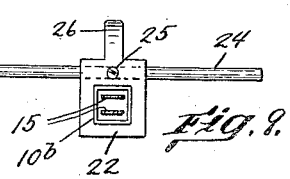
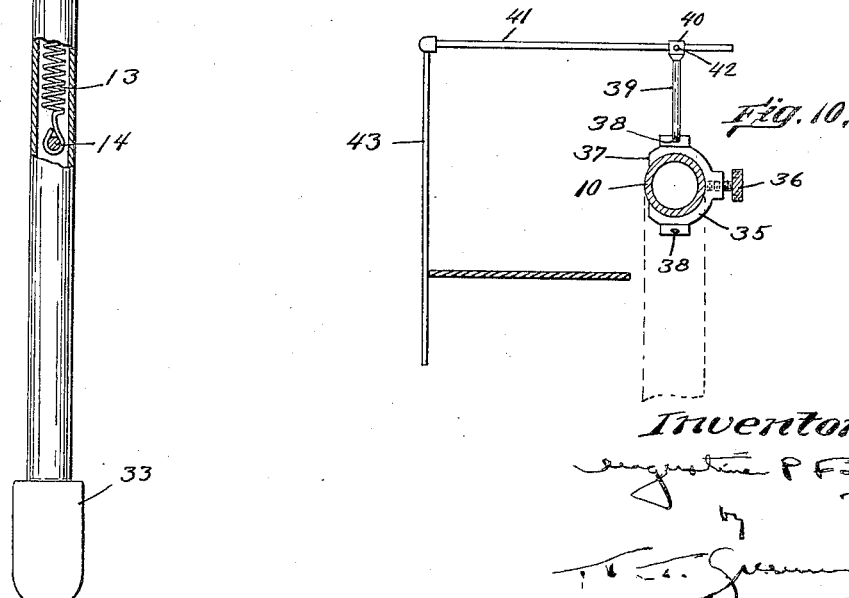
Inventor.
Augustine P Fay

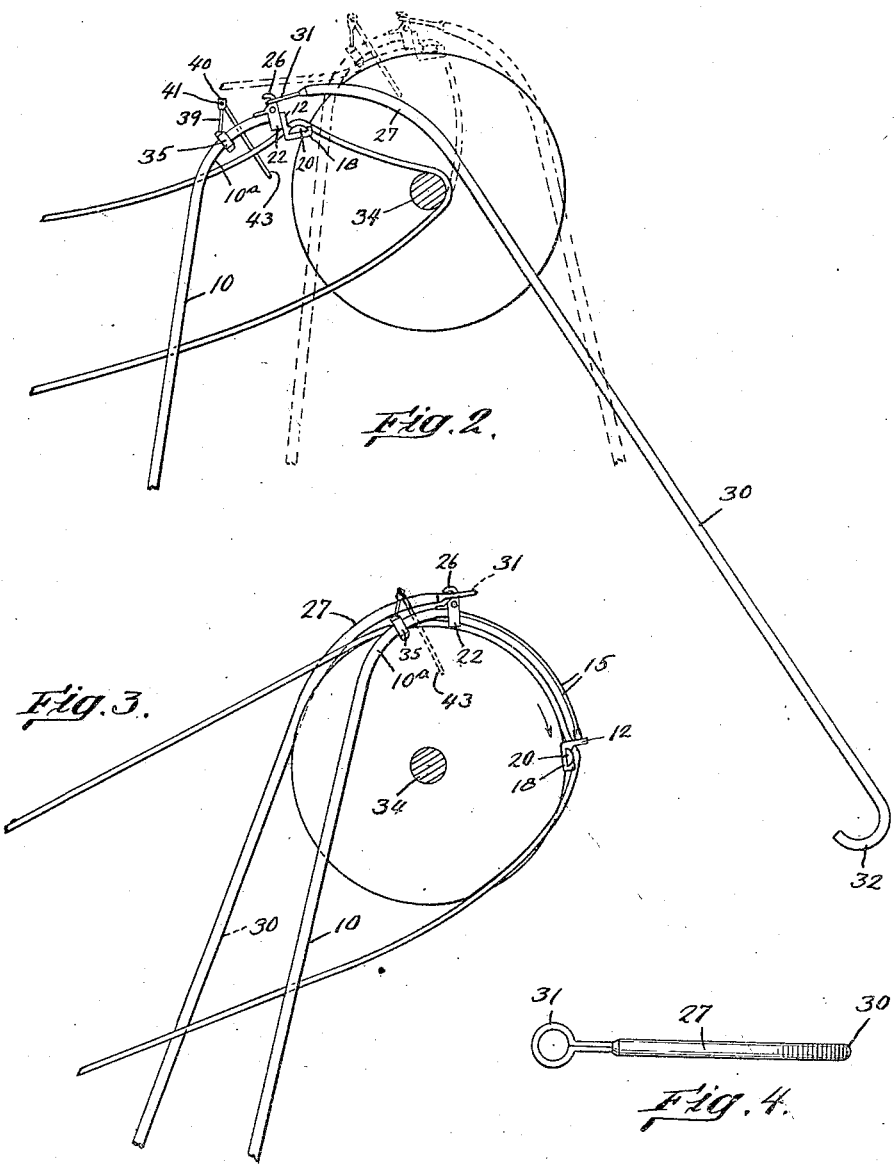

Patented May 13, 1924.

1,493,850

UNITED STATES PATENT OFFICE.

AUGUSTINE P. FAY, OF ROXBURY, MASSACHUSETTS.

BELT-REPLACING DEVICE.

Application filed May 27, 1920. Serial No. 384,774.

*To all whom it may concern:*

Be it known that I, AUGUSTINE P. FAY, a citizen of the United States, residing at Roxbury, in the county of Suffolk and State of Massachusetts, have invented an Improvement in Belt-Replacing Devices, of which the following is a specification.

This invention relates to belt replacing devices of the type set forth in my Patent No. 1,250,571, dated December 17, 1917.

It has been found to require considerable strength on the part of a single operative to replace on its pulley a long, heavy and wide belt with the belt pole set forth in the above patent.

Consequently, an object of this invention is to provide the belt pole with means by which a second operative may assist in the belt replacing operation, and specifically, this object is to provide the belt pole with an auxiliary assisting pole arranged to be connected with the belt pole and manipulated by an assisting operative in conjunction with the belt pole for replacing large belts.

A further object is to improve the construction and ease of operation and extend the field of use of the belt replacing device set forth in my above-named patent.

Fig. 1 is a side view of a belt pole with my invention embodied therein, partly broken away to illustrate constructional details thereof.

Fig. 2 is a diagrammatic representation of the manner of using the belt pole with the auxiliary pole to replace a belt.

Fig. 3 is a diagrammatic representation of another manner of using the auxiliary pole with the belt pole.

Fig. 4 is a plan view of the auxiliary pole.

Fig. 5 is a front view of the belt-engaging elements of the pole.

Fig. 6 is a plan view of the elements of Fig. 5.

Fig. 7 is a section along line 7—7 of Fig. 6.

Fig. 8 is a plan view of the tool-holder with the belt tool removed.

Fig. 9 is a view of the end of the belt pole with the tool-holder pulled out and the flexible connecting strips broken off.

Fig. 10 is a section along line 10—10 of Fig. 1 illustrating the adjustable belt guide.

As here shown my invention is embodied in the belt pole comprising the hollow tube 10 with the curved end portion $10^a$ the end $10^b$ of which is swaged down to a non-circular and preferably square cross-section to form a socket adapted to receive the lug 11 of the tool-holder 12. A retractile spring 13 is concealed within said tube below the curved portion thereof and its lower end may be secured in fixed position as by engaging the rivet 14 arranged in the wall of the tube. The upper end of the spring is connected to the two flexible strips 15 through the intermediary of the block 16 to which said strips are riveted. Said strips extend from said spring through the curved portion of said tube and are secured in slots in the lug 11 of the tool-holder, thereby flexibly to connect the tool-holder and spring and permit the holder to be drawn out of its socket and follow the belt around the pulley and subsequently be returned to its socket by said spring. Said strips are so secured to the tool-holder that they are spaced apart and each may independently assume a proper share of the spring tension.

A rivet or pin 17 extended through the wall of the curved portion of the tube serves as a stop-member adapted to be engaged by the junction, as the block 16, of the strips to restrict the extent of outward movement of the tool-holder; and said rivet may have other functions, hereinafter to be described.

Said tool-holder 12 is formed with the extension 18 having a tool-receiving groove therein here shown as a dove-tailed groove 19 adapted adjustably to receive the tool 20.

The tool 20 may comprise a bar of suitable length and dimensions to engage various widths of belts and may be shaped to slide and be retained within said groove 19. For some purposes the tool may have a plurality of teeth 21 adapted positively to engage the belt by which the belt-replacing operation, for the larger sizes of belts, may be performed the more easily; and the teeth preferably are inclined in a direction opposite to the motion of the belt, thereby the more effectively to engage and hold the belt.

The tool may be adjusted outwardly or inwardly in its holder for various widths of belts and the screw $21^a$ countersunk in the extension 18 of the tool-holder may serve to secure it in any adjusted position.

When the belt replacing device is used to replace certain types of belts, as quarter-turn belts, the belt has a tendency to ride up on its edge or turn over on the belt tool, and it is an object of my invention to provide means for holding the belt to prevent this movement. For this purpose the collar 22 having a square aperture therein is received over the squared end of the pole and secured thereto and an arm 23 thereof extends along and may be secured to the belt pole whereby additionally to support and steady the collar. Said collar has a transverse aperture therethrough in which the rod 24 is slidably received; and said rod may be extended variable distances on opposite sides of the pole for various widths of belts and may be secured in adjusted position by the set-screw 25. Said rod is disposed above and somewhat to the rear of the belt tool in its retracted position and the belt is adapted to be arranged over the belt tool and under said rod, which latter thereby holds the belt substantially flat on the belt tool.

It has been found to require considerable strength to replace a heavy and wide belt on its pulley and I thereby provide an auxiliary pole adapted for detachable connection with the belt pole by which another operative may assist in the belt replacing operation.

For this purpose the collar 22 is formed with the hook 26 rising from its upper portion adapted to be engaged by the auxiliary pole.

The auxiliary pole comprises a tube 30 of suitable length having a curved top-portion 27 terminating in the eye 31 adapted loosely to fit over the hook 26 of the belt pole. The lower end of said auxiliary pole terminates in the hook-portion 32 which may be employed to pull off a belt from its pulley; and it also prevents the pole from injuring the operative during the belt replacing act. For this reason also the end of the belt pole is provided with the cap 33 having a smooth and rounded end.

Figs. 2 and 3 illustrate the manner of using the auxiliary pole. In Fig. 2 the operative with the belt pole stands on one side of the shaft 34 and the assisting operative with the auxiliary pole stands on the other side of the shaft and reaches the pole over the shaft and engages the hook 26 of the belt pole to raise it whereby to assist the operative with the belt pole in raising the belt and placing it on the face of the pulley. Once the belt engages a portion of the face of the pulley, the remainder of the operation is entirely automatic.

In Fig. 3 the assisting operative stands on the same side of the shaft as the principal operative with the belt pole and pushes upward on the upper end of the belt pole.

One belt pole is adapted to replace belts on pulleys of various diameters and it sometimes happens that a pulley on which a belt is to be replaced is so great in diameter that the belt tends to run over the top of the curved end-portion 10$^a$ of the pole and come off over the belt pole. To prevent this, I arrange the collar 35 on the curved end portion 10$^a$ of the pole and removably secure it in place by the set-screw 36. A side portion 37 of said collar is made substantially flush or slightly inset from the side of the tube so that there may be no projecting part of the pole on that side adapted to engage the belt or the rim of the pulley. Opposite portions of said collar are bevelled off and have tapped holes 38 therein removably to receive the rod 39 which is adapted to extend substantially parallel with the straight portion of the pole and form a prolongation thereof. The collar will be reversed in position on said pole and said rod 39 received in the other hole 38 when it is desired to replace a belt from the other side of the pole.

It is sometimes desirable to engage both sides of the belt by the belt pole. For this purpose the rod 39 is provided with the enlarged head 40 having a transverse aperture therein in which the rod 41 is slidably received and secured by the set-screw 42. Said rod has a downward extension 43 adapted to engage the far edge of the belt and hold it between itself and the belt pole.

The rivet 17, in conjunction with the double flexible strips 15 disposed on opposite sides of said rivet, serves to guide the extendible head 12, after it has been moved away from the end of the pole in the belt-replacing operation, to return to its predetermined position on the pole. When the head is extended, it is free to swing and assume substantially any angular position, by reason of the flexibility of the strips 15, but when the head is drawn back toward the pole by the spring 13, the rivet 17 will take out whatever twist there may be to the strips and cause the head to rotate angularly to re-engage the pole in its original position. The length of those portions of the strips 15 between the head 12 and the rivet 17, when the head is in position on the pole, is adapted to be relatively short, so that the rivet may resist angular movement of the head on the pole. Under certain conditions, the rivet 17 and the strips 15 may serve as the means to support the head against angular movement while on the pole instead of forming the end of the pole and the lug 11 of the head of such cooperating shapes as to resist angular movement of the head. The strips 15 may be considered as the equivalent of the lug 11 and serve as extensions of the head to engage the rivet 17, and said rivet 17 may be considered the equivalent of the square end 10$^b$ of the pole.

I claim:

1. A belt replacing device comprising a belt pole having belt-engaging means and a hook at its upper end, and an auxiliary assisting pole having means at its upper end for detachable engagement with said hook.

2. A belt replacing device comprising a belt pole having belt-engaging means and a hook at its upper end, and an auxiliary assisting pole having an eye at its upper end for detachable engagement with said hook.

3. A belt replacing device comprising a tube having a curved end-portion having a hook, and belt-engaging means removably carried by said end-portion, and an auxiliary assisting-pole having a curved end-portion and an eye carried thereby arranged for detachable connection with said hook.

4. In a belt replacing device, an auxiliary assisting pole comprising a tube having an upper curved end-portion and an eye carried thereby arranged for detachable engagement with a belt pole, and also having a lower hooked end-portion.

5. In a belt replacing device, a belt tool comprising a bar of substantial length having a substantially smooth lower pulley-engaging face, and an upper belt-engaging face provided with a plurality of belt-engaging teeth.

6. In a belt replacing device, a belt tool comprising a bar of substantial length having a substantially smooth lower pulley-engaging face, and an upper belt-engaging face provided with a plurality of inclined belt-engaging teeth.

7. In a belt replacing device a belt tool holder having a projecting-portion with a transverse dove-tailed slot therein, and a belt tool having a lower pulley-engaging face and inwardly inclined upper side faces slidably received in said slot and a set-screw carried by said holder to clamp the tool therein.

8. A belt replacing device comprising a pole, a belt tool normally carried by the upper end of said pole arranged to engage the underside of the belt and be moved away from the pole by the belt during the belt-replacing operation, means automatically to restore said tool to normal position, and means to hold the belt on said tool during the belt-replacing operation comprising a belt guide carried by the upper end of said pole and extended laterally from the pole above and substantially parallel with said belt tool and adapted to be engaged by the upper side of the belt.

9. A belt replacing device comprising a pole, a belt tool normally carried by the upper end of said pole arranged to engage the underside of the belt and be moved away from the pole by the belt during the belt-replacing operation, means automatically to restore said tool to normal position, and means to hold the belt on said tool during the belt-replacing operation comprising a belt guide carried by the upper end of said pole and extended laterally from the pole above and substantially parallel with said belt tool and adapted to be engaged by the upper side of the belt, and means having provision for the lateral adjustment of said belt guide with respect to said pole.

10. A belt replacing device comprising a tube having a collar about its end with a transverse passage therethrough, a belt guide slidably received therein, and a belt tool removably supported in the end of said tube below said belt guide.

11. A belt replacing device comprising a tube, a collar having a transverse passage therethrough and a hook-portion, a belt guide slidably received in said passage, and a belt tool removably supported in the end of said tube below said belt guide.

12. A belt replacing device comprising a cylindrical tube having a straight body and a curved end-portion with the end thereof formed into non-circular shape to form a socket, a tool holder having a corresponding non-circular projection removably received in said socket, a retractile spring disposed within the straight body of said tube having its lower end fixed thereto, and a flexible strip connecting said spring and the projection of said tool holder.

13. A belt replacing device comprising a tube having a straight body portion and a curved end portion, a tool holder removably received in the end of said curved portion, and means removably arranged on the curved end portion of the tube to extend the effective height of the same.

14. A belt replacing device comprising a pole having a belt tool carried by its end extensible therefrom, and means extended from the pole arranged to receive the belt between it and the pole during the belt replacing operation.

15. A belt replacing device comprising a pole having a belt tool carried by its end extensible away therefrom, a collar movably arranged on said pole below the belt tool having an upwardly-extended portion and a rod having a downward end-extension slidably carried by such upwardly extended portion of said collar arranged to receive the belt therebetween and the pole.

16. An attachment for a belt pole comprising a collar adapted to fit over the pole having a lateral face thereof inset from one side of the pole and having diametrically opposed axially-inclined faces with tapped holes therein, and a threaded rod adapted to be received in said holes.

17. An attachment for a belt pole comprising a collar adapted to fit over the pole having a lateral face thereof inset from one side of the pole and having diametrically opposed axially-inclined faces with tapped holes therein, and a threaded rod adapted to be received in said holes having a transverse aperture through its upper portion and a rod with a downward end-extension adjustably received therein.

18. A belt replacing device comprising a pole having a curved end-portion, an extensible belt tool normally supported at the end of the pole and arranged to be withdrawn away from the end thereof during the belt-replacing operation, a retractile spring disposed within the body of the pole and arranged to return said belt tool to normal position, a flexible strip disposed within the body of said pole and connected with said spring and belt tool, and means to limit the extent of movement of said belt tool away from the end of said pole.

19. A belt replacing device comprising a pole having a curved end-portion, an extensible belt tool normally supported at the end of the pole and arranged to be withdrawn away from the end thereof during the belt-replacing operation, a retractile spring disposed within the body of the pole and arranged to return said belt tool to normal position, a flexible strip disposed within the body of said pole and connected with said spring and belt tool, and means carried by said pole and engageable with said flexible strip to limit the extent of movement of said belt tool away from the end of said pole.

20. A belt replacing device comprising a pole having a curved end-portion, an extensible belt tool normally supported by said curved end-portion and arranged to be engaged and withdrawn from the end of the pole by the belt, a retractile spring disposed within the body of the pole arranged to return said belt tool to normal position, two flexible strips having connected inner ends disposed within said pole and connected with said spring and belt tool, and a pin carried by said curved end-portion of said pole and disposed between said strips arranged to engage said strips to limit the extent of movement of said belt tool away from the end of said pole.

21. A belt replacing device comprising a hollow pole having an open upper end, a belt tool received normally in said open end and arranged to be engaged by the belt and withdrawn away from the pole during the belt-replacing operation, means to return said belt tool to normal position including a retractile spring disposed within said pole having connection with said belt tool, and means to guide said belt tool for return to normal position including opposed members carried by said belt tool arranged to extend within the open end of said pole, and a fixed member disposed adjacent the open end of said pole extended between and arranged to engage said extensions.

In testimony whereof I have signed my name to this specification.

AUGUSTINE P. FAY.